Jan. 22, 1935.  J. F. WEILAND  1,988,975
MOTOR VEHICLE
Filed Jan. 7, 1933  2 Sheets-Sheet 2
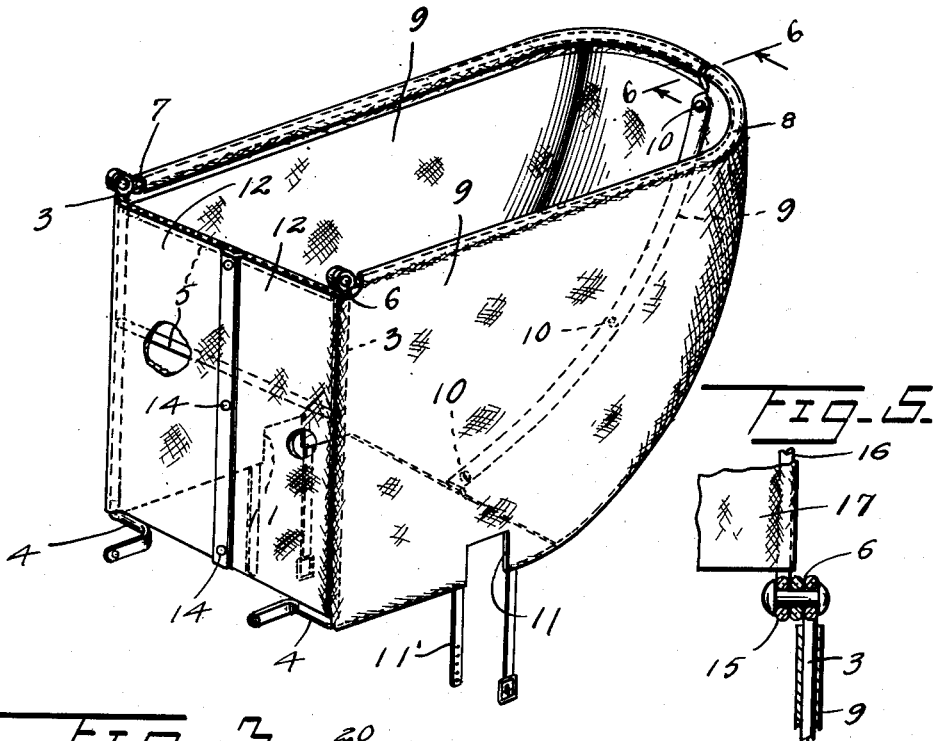
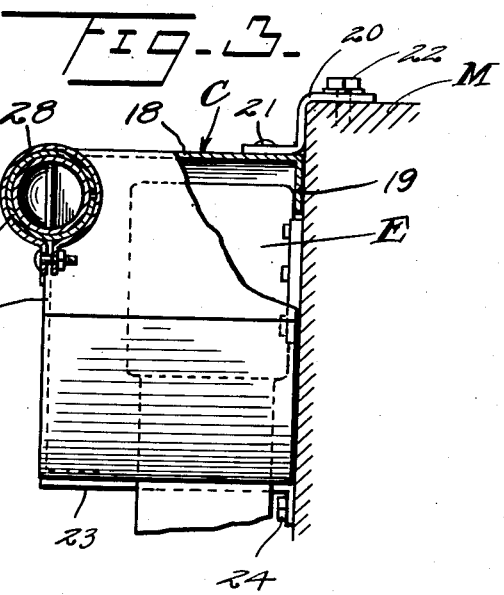
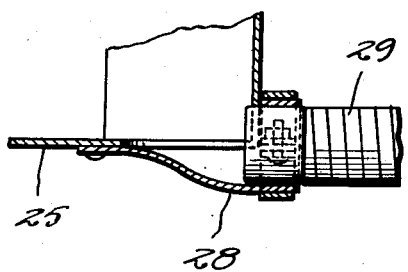
Inventor
J. F. Weiland
By Watson E. Coleman
Attorney Patented Jan. 22, 1935

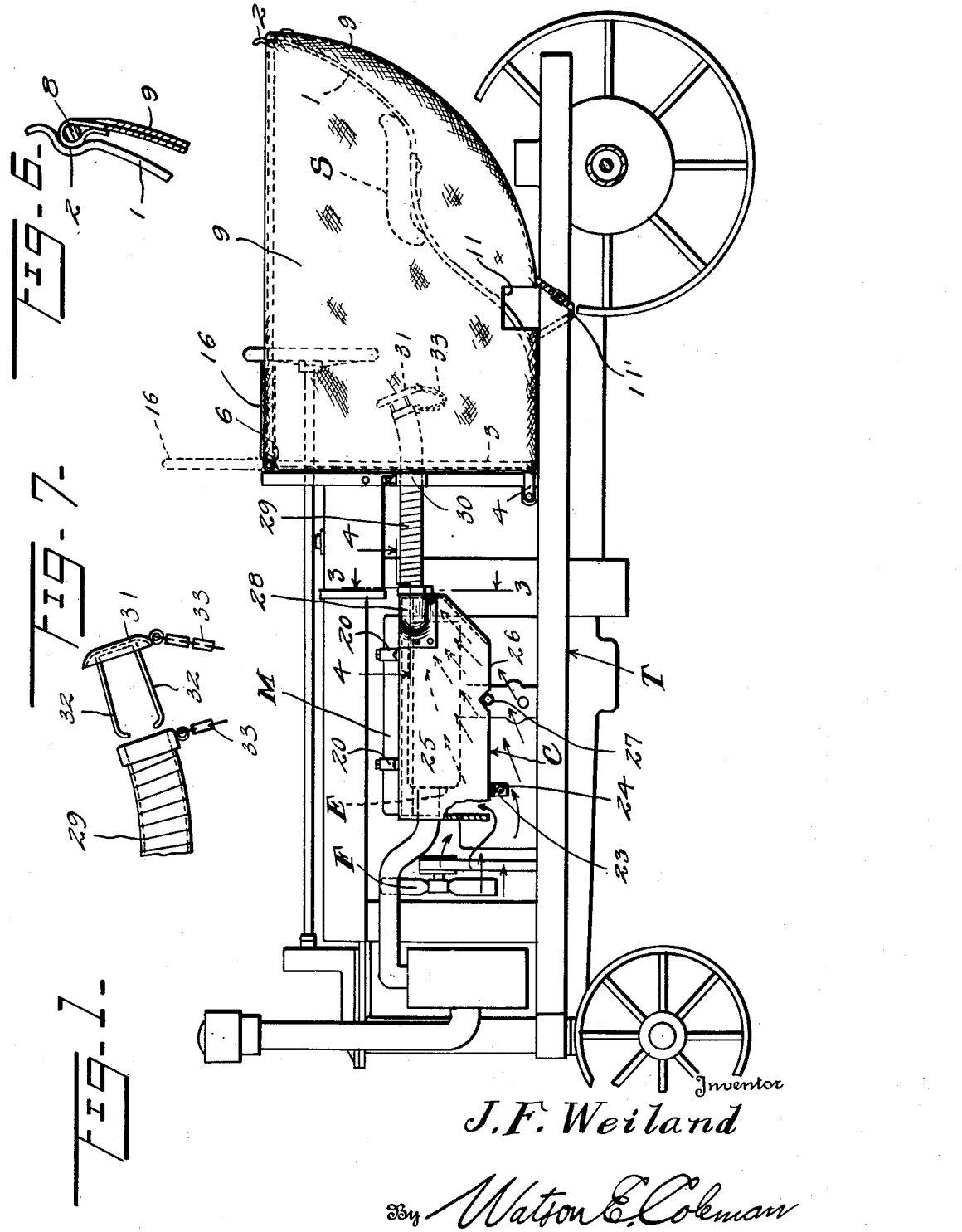

1,988,975

UNITED STATES PATENT OFFICE 1,988,975

MOTOR VEHICLE

James F. Weiland, Otter Creek, Iowa

Application January 7, 1933, Serial No. 650,716

6 Claims. (Cl. 296—82)

This invention relates to a heating apparatus, and it is primarily an object of the invention to provide an apparatus of this kind especially designed and adapted for use in connection with a tractor or kindred vehicle and which can be used to advantage in cold weather to keep warm the driver of the vehicle.

It is also an object of the invention to provide an apparatus of this kind comprising a structure which substantially surrounds the driver of the vehicle and more especially when occupying the seat to provide a space in which is delivered air warmed by the heat of the motor particularly by the heat radiating from the exhaust manifold. The invention also has for an object to provide an apparatus of this kind comprising an enclosure adapted to partially enclose the driver of the vehicle together with means for delivering heated air within such enclosure and wherein means are provided for regulating such delivery of air into the enclosure.

The invention consists in the details of construction and in the combination and arrangement of the several parts of my improved heating apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating an apparatus constructed in accordance with an embodiment of my invention and in applied position upon a tractor;

Figure 2 is a view in perspective of the enclosing member as herein employed unapplied;

Figure 3 is an enlarged fragmentary sectional view taken substantially on the line 3—3 of Figure 1;

Figure 4 is a fragmentary longitudinal sectional view on an enlarged scale taken substantially on the line 4—4 of Figure 1;

Figure 5 is a fragmentary elevational view of the swinging member associated with the enclosure;

Figure 6 is a fragmentary detailed sectional view taken substantially on the line 6—6 of Figure 2;

Figure 7 is a fragmentary view in elevation of the discharge end of the air conduit and the regulating cap therefor.

As disclosed in the accompanying drawings, T denotes a tractor of a conventional type including an internal combustion motor M having associated therewith an exhaust manifold E. The rear portion of the tractor T is provided with a conventional seat structure S. Secured to this structure S and extending upwardly and rearwardly therefrom is a spring arm 1 provided in its upper or free end portion with a recess 2 for a purpose to be hereinafter more particularly referred to.

Secured to the frame of the tractor T a desired distance in advance of the seat structure S and to the opposite sides thereof are the upstanding posts 3. The lower portions of these posts are provided with inwardly directed angular arms 4 whereby the desired mounting of these posts 3 may be effected. The upper portions of the posts are connected by cross braces 5.

The upper end portions of the posts 3 have pivotally connected thereto, as at 6, the free extremities of the side arms 7 of a substantially U-shaped yoke member. This yoke member is of desired dimensions and is of a length to extend a desired distance rearwardly of the seat structure S and when in desired raised position the rear or intermediate portion 8 of the yoke is engaged within the recess 2 of the spring arm 1 whereby said yoke is maintained in desired raised position.

The side members 7 of the yoke have suitably secured thereto the upper marginal portions of the side curtains 9 which extend along the intermediate portion 8 with their rear ends adapted to be connected together, as at 10, by snap fasteners or other desired connecting means. The rear portions of the curtains 9 are so cut and formed as to extend downwardly on a forward curvature to underlie the seat structure S and the forward portions of these curtains 9 in their lower margins are provided with the cut outs 11 for the axles of the tractor, in the event the enclosure structure is employed in connection with a type of tractor wherein the axle of the tractor is below the portions of the side curtains 9 having the notches or recesses 11.

Extending from each of the curtains 9 at the opposite ends of the notch 11 are the straps 11' adapted to be engaged around the axle or around any other part of the tractor to further assure the maintenance of the enclosure in desired working position. In Figure 1 of the drawings I show these straps 11' engaged with the side member of the chassis.

The forward ends of the curtains 9 are continued by the flaps 12 which are adapted to close the forward end of the enclosure, said flaps being secured to each other by the snaps 14 or other suitable fastening elements. The upper end portions of the posts 3 also have pivotally connected thereto, as at 15, the extremities of the frame 16 in the form of an inverted U and which has disposed thereover a lamination 17 of canvas or the like. When this frame 16 is thrown or positioned rearwardly as illustrated in Figure 1 it provides a cover for the forward upper end portion of the enclosure to further protect the occupant of the seat structure S. If desired this frame 16 may be thrown or adjusted into an upstanding position as indicated by broken lines in Figure 1 to serve as a windshield or may be thrown or swung entirely forward out of the way when not desired to be used.

Disposed over the top and outer side of the exhaust manifold E is a casing C. This casing is closed at its opposite ends but open at its bottom. Its inner face is closed by the block of the motor M when the casing C is in applied position as is particularly illustrated in Figure 3 of the drawings.

The top wall 18 of the casing C has its inner marginal portion defined by an inwardly directed flange 19 which engages between the manifold E and the motor block to assure the maintenance of the casing C in desired position. The casing C, however, is positively held to the motor block by the clips 20 riveted, as at 21, or otherwise secured to the top wall 18 of the casing C and so positioned as to have an end portion overlying the motor block and held thereto by a screw or kindred headed member 22. To further assure the maintenance of the casing C in applied position the lower marginal portion thereof may have secured thereto a clip 23 bolted, as at 24, or otherwise attached to an adjacent portion of the motor block. This outer wall 25 of the casing C midway its ends may also be provided with the notch or recess 26 to receive a bolt 27 or the like extending out from the manifold E and which bolts in certain types of motors are used to hold a carburetor to the exhaust manifold.

Clamped, as at 28, to the rear portion of the outer side wall 25 of the casing C and at the upper portion of such casing is an end portion of a hose or conduit 29 of a length to terminate within the enclosure and in advance of the seat structure S. The extended portion of this hose or conduit 29 is supported upon a suitably positioned part of the tractor proper by a clamp 30. The discharge end portion of the hose or conduit 29 or that part within the enclosure has coacting therewith a regulator cap 31.

As particularly illustrated in Figure 1 this cap 31 is provided with the spring arms 32 adapted to frictionally engage within the discharge end portion of the pipe or conduit 29 so that the cap 31 may be held in different positions with respect to the adjacent end of the hose or conduit 29. In order to prevent loss or misplacement of the cap 31 the same is connected to the pipe or conduit 29 by a chain 33 or the like of desired length.

With the motor in action air is blown by a regular fan F which is in advance of the applied casing C up through the casing and around the exhaust manifold whereby such air is effectively heated. The air then passes out through the pipe or conduit 29 into the enclosure whereby the occupant of the seat S may be kept warm when driving in a low temperature.

From the foregoing description it is thought to be obvious that a heating apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with a tractor or kindred vehicle including a seat structure, upstanding posts carried by the vehicle in advance of the seat structure, a substantially U-shaped yoke having its extremities pivotally secured to the upper portions of the posts, side curtains engaged with the yoke extending from a point above the seat structure to a point therebelow, the yoke being of a length to carry the side curtains rearwardly of the seat structure, and releaseable means engageable with the yoke to maintain the same in raised position when the yoke is disposed substantially at right angles to the post.

2. In combination with a tractor or kindred vehicle including a seat structure, upstanding posts carried by the vehicle in advance of the seat structure, a substantially U-shaped yoke having its extremities pivotally secured to the upper portions of the posts, side curtains engaged with the yoke extending from a point above the seat structure to a point therebelow, the yoke being of a length to carry the side curtains rearwardly of the seat structure, releaseable means engageable with the yoke to maintain the same in raised position when the yoke is disposed substantially at right angles to the post, and flaps carried by the forward end portions of the side curtains and adapted to be secured one to the other to close the forward end of the enclosure.

3. In combination with a tractor or kindred vehicle including a seat structure, upstanding posts carried by the vehicle in advance of the seat structure, a substantially U-shaped yoke having its extremities pivotally secured to the upper portions of the posts, side curtains engaged with the yoke extending from a point above the seat structure to a point therebelow, the yoke being of a length to carry the side curtains rearwardly of the seat structure, releaseable means engageable with the yoke to maintain the same in raised position, and flaps carried by the forward end portions of the side curtains and adapted to be secured one to the other to close the forward end of the enclosure, the rear portions of the side curtains being formed to extend inwardly of and below the seat structure of the tractor.

4. In combination with a vehicle including a seat structure, a yoke, means for pivotally holding the extremities of the yoke at points above and in advance of the seat structure, said pivotal connections allowing the yoke to have swinging movement in a vertical direction, curtains depending from the yoke surrounding and extending below the seat structure when the yoke is raised to a substantially horizontal position, and releaseable means for holding said yoke in said position.

5. In combination with a vehicle including a seat structure, a yoke, means for pivotally holding the extremities of the yoke at points above and in advance of the seat structure, said pivotal connections allowing the yoke to have swinging movement in a vertical direction, curtains depending from the yoke surrounding and extending below the seat structure when the yoke is raised to a substantially horizontal position, a spring arm extending upwardly and rearwardly from the seat structure, said arm coacting with the yoke to hold the same against downward movement after being raised into substantially a horizontal position.

6. In combination with a vehicle including a seat structure, a yoke, means for pivotally holding the extremities of the yoke at points above and in advance of the seat structure, said pivotal connections allowing the yoke to have swinging movement in a vertical direction, curtains depending from the yoke surrounding and extending below the seat structure when the yoke is raised to a substantially horizontal position, releaseable means for holding said yoke in said position, and attaching means carried by the lower marginal portions of the curtains.

JAMES F. WEILAND.